(12) United States Patent
Paka et al.

(10) Patent No.: US 7,769,880 B2
(45) Date of Patent: Aug. 3, 2010

(54) CARRYING PROTECTED CONTENT USING A CONTROL PROTOCOL FOR STREAMING AND A TRANSPORT PROTOCOL

(75) Inventors: Anand Paka, Bellevue, WA (US);
Anders E. Klemets, Redmond, WA (US); Eduardo P. Oliveira, Redmond, WA (US); Sanjay Bhatt, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 278 days.

(21) Appl. No.: 11/176,058

(22) Filed: Jul. 7, 2005

(65) Prior Publication Data

US 2007/0011344 A1 Jan. 11, 2007

(51) Int. Cl.
*G06F 15/16* (2006.01)
*H04N 7/173* (2006.01)
*H04N 7/16* (2006.01)
*G06F 15/173* (2006.01)

(52) U.S. Cl. ............................ 709/231; 725/87; 725/25; 709/224

(58) Field of Classification Search .................. 709/231
See application file for complete search history.

(56) References Cited

U.S. PATENT DOCUMENTS

| | | | |
|---|---|---|---|
| 5,224,166 A | 6/1993 | Hartman, Jr. | |
| 6,134,243 A | 10/2000 | Jones et al. | |
| 6,205,140 B1 | 3/2001 | Putzolu et al. | |
| 6,278,478 B1 | 8/2001 | Ferriere | |
| 6,512,778 B1 | 1/2003 | Jones et al. | |
| 6,654,389 B1 | 11/2003 | Brunheroto et al. | |
| 6,856,997 B2 | 2/2005 | Lee et al. | |
| 6,918,034 B1 | 7/2005 | Sengodan et al. | |
| 6,944,296 B1 | 9/2005 | Liu et al. | |
| 6,965,646 B1 | 11/2005 | Firestone | |
| 6,983,049 B2 | 1/2006 | Wee et al. | |
| 6,993,137 B2 * | 1/2006 | Fransdonk | .................. 380/279 |
| 7,010,032 B1 | 3/2006 | Kikuchi et al. | |
| 7,080,043 B2 | 7/2006 | Chase, Jr. et al. | |

(Continued)

FOREIGN PATENT DOCUMENTS

CN       1643474 (A)       7/2005

(Continued)

OTHER PUBLICATIONS

Curet, et al., "RTP Payload Format for MPEG-4 FexMultiplexed Streams", Internet Engineering Task Force, Internet Draft, XP-001075015, Nov. 8, 2001, 12 pages.

(Continued)

*Primary Examiner*—Yemane Mesfin
*Assistant Examiner*—Joiya M Cloud
(74) *Attorney, Agent, or Firm*—Lee & Hayes, PLLC

(57) ABSTRACT

Various embodiments utilize methods of protecting content, such as Digital Rights Management (DRM), to enable secure playback of content on machines and devices within a local network, such as a home media network. In at least some embodiments, messages and content are delivered using, respectively, a control protocol for streaming and a transport protocol. In at least some embodiments, the control protocol for streaming is Real Time Streaming Protocol (RTSP), and the transport protocol is Real Time Transport Protocol (RTP).

16 Claims, 11 Drawing Sheets

U.S. PATENT DOCUMENTS

| | | | |
|---|---|---|---|
| 7,136,945 B2 * | 11/2006 | Gibbs et al. | 710/62 |
| 7,145,919 B2 * | 12/2006 | Krishnarajah et al. | 370/474 |
| 7,174,452 B2 | 2/2007 | Carr | |
| 7,257,641 B1 | 8/2007 | VanBuskirk et al. | |
| 7,346,160 B2 | 3/2008 | Michaelsen | |
| 7,536,418 B2 | 5/2009 | Buchsbaum et al. | |
| 2001/0052135 A1 | 12/2001 | Balakrishnan et al. | |
| 2002/0002674 A1 | 1/2002 | Grimes et al. | |
| 2002/0004773 A1 | 1/2002 | Xu et al. | |
| 2003/0041257 A1 | 2/2003 | Wee et al. | |
| 2003/0056118 A1 | 3/2003 | Troyansky et al. | |
| 2003/0081592 A1 | 5/2003 | Krishnarajah et al. | |
| 2003/0103243 A1 | 6/2003 | Watanabe et al. | |
| 2003/0131353 A1 * | 7/2003 | Blom et al. | 725/25 |
| 2003/0161473 A1 | 8/2003 | Fransdonk | |
| 2004/0042451 A1 * | 3/2004 | Takaku | 370/389 |
| 2004/0125757 A1 * | 7/2004 | Mela et al. | 370/261 |
| 2004/0143736 A1 | 7/2004 | Cross et al. | |
| 2005/0002402 A1 | 1/2005 | Fairman | |
| 2005/0008240 A1 | 1/2005 | Banerji et al. | |
| 2005/0069039 A1 | 3/2005 | Crinon | |
| 2005/0099869 A1 | 5/2005 | Crinon et al. | |
| 2005/0108746 A1 | 5/2005 | Futagami et al. | |
| 2005/0157727 A1 | 7/2005 | Date et al. | |
| 2005/0163052 A1 * | 7/2005 | Savage et al. | 370/241 |
| 2005/0169303 A1 | 8/2005 | Toma et al. | |
| 2005/0169444 A1 | 8/2005 | Inon | |
| 2005/0177875 A1 | 8/2005 | Kamperman et al. | |
| 2005/0216413 A1 | 9/2005 | Murakami | |
| 2005/0254526 A1 * | 11/2005 | Wang et al. | 370/503 |
| 2005/0265555 A1 * | 12/2005 | Pippuri | 380/284 |
| 2006/0104356 A1 | 5/2006 | Crinon | |
| 2006/0130104 A1 | 6/2006 | Budagavi | |
| 2006/0161635 A1 * | 7/2006 | Lamkin et al. | 709/217 |
| 2006/0167985 A1 * | 7/2006 | Albanese et al. | 709/203 |
| 2006/0184790 A1 | 8/2006 | Oliveira et al. | |
| 2006/0262732 A1 | 11/2006 | Joutsenvirta et al. | |
| 2006/0268099 A1 | 11/2006 | Potrebic et al. | |
| 2006/0291475 A1 | 12/2006 | Cohen | |
| 2007/0003064 A1 | 1/2007 | Wiseman et al. | |
| 2007/0016594 A1 | 1/2007 | Visharam et al. | |
| 2007/0016784 A1 | 1/2007 | Vauclair | |
| 2007/0104105 A1 | 5/2007 | MeLampy et al. | |
| 2007/0106814 A1 | 5/2007 | Son et al. | |
| 2007/0171903 A1 * | 7/2007 | Zeng et al. | 370/389 |
| 2007/0248073 A1 | 10/2007 | Pattavina et al. | |
| 2007/0274393 A1 | 11/2007 | Toma et al. | |
| 2008/0052751 A1 | 2/2008 | Cromarty et al. | |
| 2008/0075168 A1 | 3/2008 | Toma et al. | |
| 2008/0126812 A1 | 5/2008 | Ahmed et al. | |

FOREIGN PATENT DOCUMENTS

| | | |
|---|---|---|
| EP | 1041823 | 10/2000 |
| EP | 1494425 | 1/2005 |
| EP | 1271830 (A2) | 1/2006 |
| JP | 2000287192 | 10/2000 |
| JP | 2002044135 (A) | 2/2002 |
| RU | 2144736 | 1/2000 |
| RU | 2159507 | 11/2000 |
| WO | WO0011849 | 3/2000 |
| WO | WO0251096 (A1) | 6/2002 |
| WO | WO03028293 (A1) | 4/2003 |
| WO | WO2004023717 | 3/2004 |
| WO | WO2004030364 | 4/2004 |
| WO | WO2004097605 (A1) | 11/2004 |

OTHER PUBLICATIONS

Handley, et al., "SDP: Session Description Protocol," The Internet Society, 1998, pp. 1-42.

Klemets, "RTP Payload Format for Video Codec 1 (VC-1)," Microsoft, Feb. 2006, pp. 1-36.

Mehaoua et al, "RTP4mux: A Novel MPEG-4 RTP Payload for Multicast Video Communications over Wireless IP", Retrieved from the Internet Mar. 22, 2005: URL: http://www.polytech.uiv-nantes. PDF.

Proposed SMPTE Standard for Television: VC-1 Compressed Video Bitstream "Format and Decoding Process," The Society of Motion Picture and Television Engineers, Aug. 23, 2005, pp. 1-480.

"RTP Profile for Audio and Video Conferences with Minimal Control", RFC 1890, available at [[http://faqs.org/rfcs/rfc1890.html]], accessed Jan. 7, 2004, 14 pages.

Schulzrinne, et al., "RTP: A Transport Protocol for Real-Time Applications," The Internet Society, 2003, pp. 1-104.

"RTP Payload Format for MPEG-4 Streams," Internet Engineering Task Force, Internet Draft, XP-001033580, Jul. 2001, 41 pages.

"SMPTE Standard for Television, Audio and Film—Time and Control Code", The Society of Motion Picture and Television Engineers, Sep. 12, 1995.

Won-Ho Kim, "Design and Implementation of MPEG-2/DVB Scrambler Unit and VLSI Chip" 1997 International Conference on Consumer Electronics vol. 43 No. 3. pp. 320-321 Jun. 1997.

Official Notice of Rejection for Chilean Patent Application No. 1549-2004, Mailed on May 30, 2008, pp. 2.

Nafaa, et al, "XP 002301132 RTTP4mux Novel MPEG-4 RTP Payload Multicast Video Communications over wireless IP".

Search Report and Written Opinion in PCT/US2006/031185, date of mailing Jan. 16, 2007, pp. 12.

"Media Distribution Technique," NTT R&D, vol. 52, No. 1, Jan. 10, 2003.

Hoffman, et al., "RTP Payload Format for MPEG1/MPEG2 Video", Network Working Group, RFC 2250, Jan. 1998, pp. 1-16.

Official Notice Of Rejection For Malaysian Patent Application No. PI 20042167 Mailed On Dec. 26, 2007, pp. 5.

\* cited by examiner

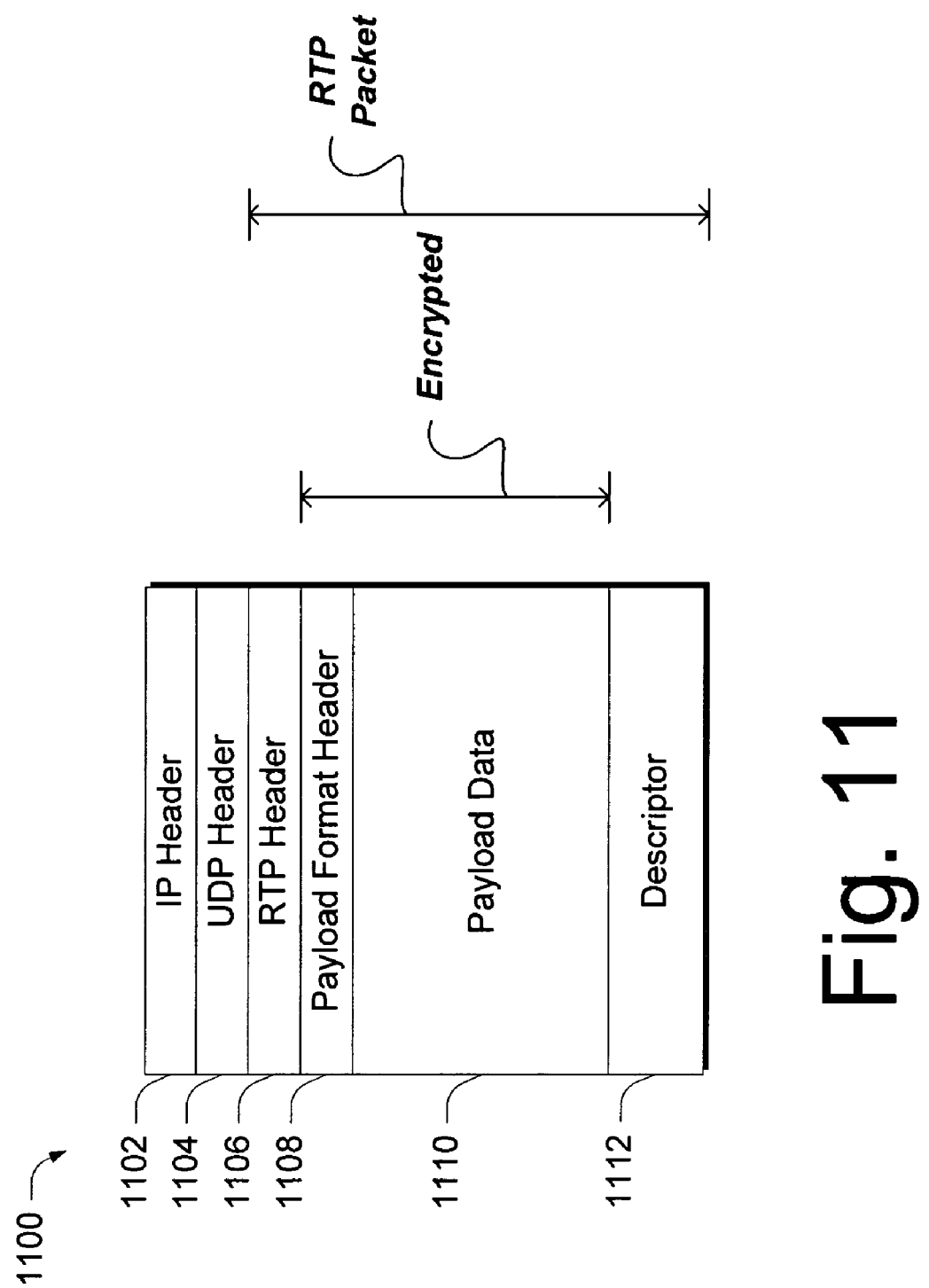

CARRYING PROTECTED CONTENT USING A CONTROL PROTOCOL FOR STREAMING AND A TRANSPORT PROTOCOL

BACKGROUND

Digital Rights Management (DRM) refers to techniques that are used to protect content, such as by controlling or restricting the use of digital media content on electronic devices. One characteristic of DRM is that it can bind the media content to a given machine or device. Thus, a license that pertains to a particular piece of content and which defines rights and restrictions associated with the piece of content will typically be bound to the given machine or device. As a result, a user will not typically be able to take the piece of content and move it to another machine in order to playback the content.

There are some technologies that permit DRM-protected content to be moved to other machines to enable playback of the content on those machines, but such technologies can tend to use non-real time protocols for content transfer that are unsuitable for simultaneous transferring and playback of the content.

SUMMARY

Various embodiments utilize methods of protecting content, such as Digital Rights Management (DRM), to enable secure playback of content on machines and devices within a local network, such as a home media network. In at least some embodiments, messages and content are delivered using, respectively, a control protocol for streaming and a transport protocol. In at least some embodiments, the control protocol for streaming is Real Time Streaming Protocol (RTSP), and the transport protocol is Real Time Transport Protocol (RTP).

BRIEF DESCRIPTION OF THE DRAWINGS

FIG. 11 illustrates a packet in accordance with one embodiment.

DETAILED DESCRIPTION

Overview

Figure 1:
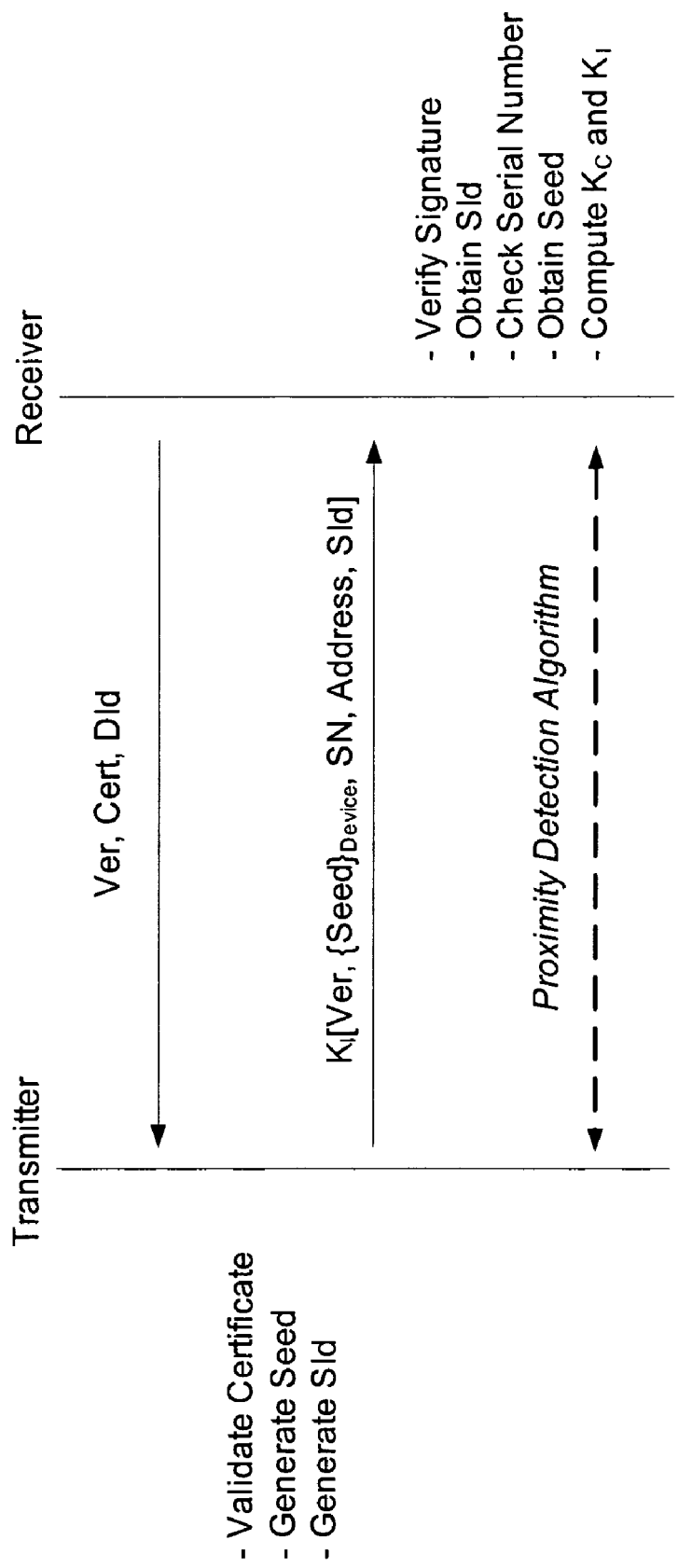
FIG. 1 illustrates an exemplary registration procedure of a protocol with which the inventive embodiments can be employed in one embodiment.

Various embodiments described herein utilize method for protecting content, such as Digital Rights Management (DRM), to enable secure playback of content on machines and devices within a local network, such as a home media network. In at least some embodiments, messages and content are delivered using, respectively, a control protocol for streaming and a transport protocol. In at least some embodiments, the control protocol for streaming is Real Time Streaming Protocol (RTSP), and the transport protocol is Real Time Transport Protocol (RTP). In these embodiments, protocol extensions are introduced which enjoy advantages offered by RTSP/RTP, including data delivery over User Datagram Protocol (UDP) and bi-directional communication between client and server, as will be appreciated by the skilled artisan.

In particular, in at least some embodiments, a protocol extension securely establishes a session using RTSP, transfers protected data encapsulated in RTP, provides schemes for encrypting and transferring the data depending on the RTP payload format, and various methods for transferring encryption parameters in conjunction with encrypted content data.

In the discussion that follows, a section entitled "Content Security and License Transfer Protocol" is provided and describes one particular system in which the inventive techniques can be employed. Following this, a section entitled "RTSP" is provided to give the reader who is unfamiliar RTSP at least some context for understanding the inventive techniques in the RTSP space. Following this section, a section entitled "Exemplary Implementation Using RTSP" is provided and describes various inventive techniques that employ RTSP for establishing a control flow, and utilize RTP for establishing a data flow.

Content Security and License Transfer Protocol

The following provides a discussion of an exemplary protocol which provides security and transfers licenses for content flowing over digital links. This protocol constitutes but one exemplary protocol with which the various inventive techniques can be employed. It is to be appreciated and understood that other protocols can be utilized without departing from the spirit and scope of the claimed subject matter.

The following cryptographic notation is used in this description:

| | |
|---|---|
| K{data} | data is encrypted with secret key K. |
| K[data] | data is signed with secret key K. |
| {data}$_{Device}$ | data is encrypted with the device's public key. |
| [data]$_{Device}$ | data is signed with the device's private key. |

In this particular protocol, there are five primary procedures: Registration, Revalidation, Proximity Detection, Session Establishment, and Data Transfer.

In the Registration procedure, a transmitter (i.e. a device that has content that is to be transmitted to another device) can uniquely and securely identify an intended receiver (i.e. a device to which content is to be transmitted). In this particular protocol, the transmitter maintains a database with registered receivers and ensures that no more than a small predetermined number of receivers are used simultaneously. During the registration process, the transmitter also employs a Proximity Detection procedure to ensure that the receiver is located "near" the transmitter in the network, in order to prevent wide distribution of protected content.

The Revalidation procedure is utilized to ensure that the receiver continues to be "near" the transmitter. Content is not delivered to receivers unless they have been registered or revalidated within a predetermined period of time in the past.

The Session Establishment procedure is used whenever the receiver requests content from the transmitter. The transmitter enforces that devices must be registered and recently validated before the Session Establishment can be completed.

Once the session is established, the Data Transfer of the requested content can take place in a secure way. The receiver may reuse the session to retrieve specific portions of the content (seeking), but must establish a new session in order to retrieve a different content.

Consider now the Registration procedure in connection with FIG. 1 and the table just below that describes the various messages that are passed between the transmitter and the receiver during registration.

| Message | Value | Description |
| --- | --- | --- |
| Registration Request Message | Ver | 8-bit Protocol Version |
| | Cert | XML digital certificate of the Receiver. |
| | DId | 128-bit Serial Number. |
| Registration Response Message | Ver | 8-bit Protocol Version |
| | { Seed }Device | 128-bit Seed used to derive the Content Encryption key and Content Integrity key. |
| | SN | 128-bit Serial Number. |
| | Address | Address of transmitter's incoming and outgoing proximity packets socket. |
| | SId | 128-bit Random Session Id. |
| | Proximity Detection Algorithm | The Proximity Detection Algorithm is executed out-of-band. |

Here, the receiver sends a registration request message that contains, among other information, the receiver's digital certificate. Responsive to receiving the registration request message, the transmitter validates the receiver's certificate, generates a seed and a random session ID, returning the same in the form indicated above to the receiver in a registration response message. The receiver then validates the transmitter's signature, obtains the session ID and performs the other actions indicated in the figure. The receiver and the transmitter can then undergo a proximity detection process which is described below.

With regard to Revalidation, the same procedures as outlined above are performed, with the difference being that during Revalidation, the receiver is already registered in the database.

Figure 2:
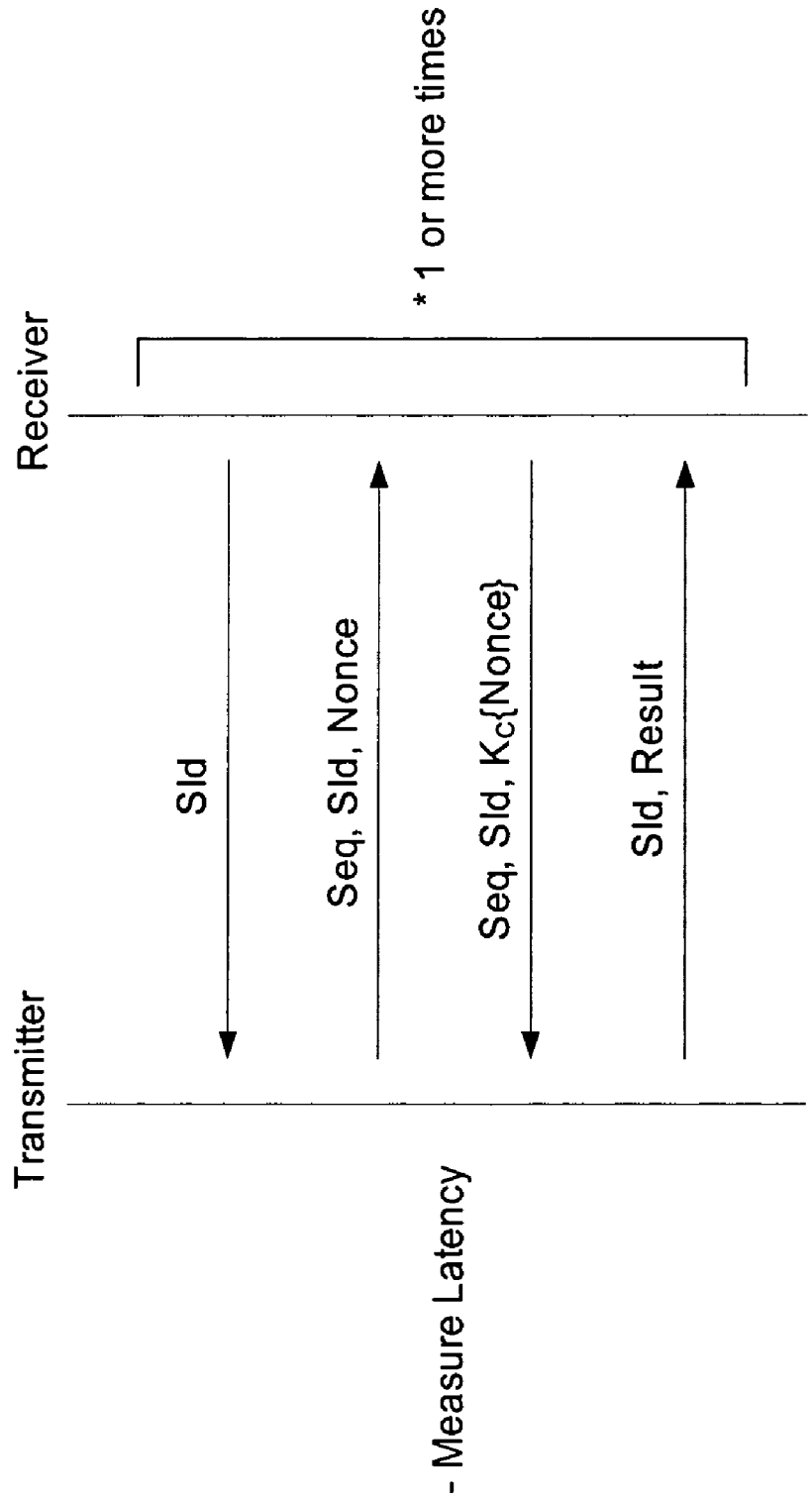
FIG. 2 illustrates an exemplary proximity detection procedure of a protocol with which the inventive embodiments can be employed in one embodiment.

With regard to Proximity Detection, consider the following in connection with FIG. 2.

During the Proximity Detection procedure, the receiver sends to the transmitter a message containing the Session Id indicated in a Proximity Detection Initialization Message. The transmitter then sends to the receiver a message containing a Nonce (128-bit random value), and measures the time it takes for the receiver to reply with the nonce encrypted using a Content Encryption key. Finally, the transmitter sends a message to the receiver indicating if the proximity detection was successful or not.

The receiver may repeat the process until it has a confirmation that the proximity detection succeeded. When this particular protocol is used over IP-based networks, the proximity detection messages are exchanged over UDP. The receiver learns the transmitter's address via the Registration Response message. The receiver's address does not need to be separately communicated since it can be determined by inspecting the incoming IP header of the UDP packet that carries the Proximity Detection Initialization Message.

The following table describes the messages that are exchanged during Proximity Detection:

| Message | Value | Description |
| --- | --- | --- |
| Proximity Start Message | SId | Same 128-bit Session Id value sent by the transmitter. |
| Proximity Challenge Message | Seq | 8-bit incremental sequence number. |
| | SId | Same 128-bit Session Id. |
| | Nonce | 128-bit Random Value. |
| Proximity Response Message | Seq | Same sequence number determined by the transmitter. |
| | SId | Same 128-bit Session Id. |
| | KC{Nonce} | 128-bit Nonce encrypted using the Content Encryption key. |
| Proximity Result Message | SId | Same 128-bit Session Id. |
| | Result | Status code indicating the success or failure of the registration procedure. |

Figure 3:
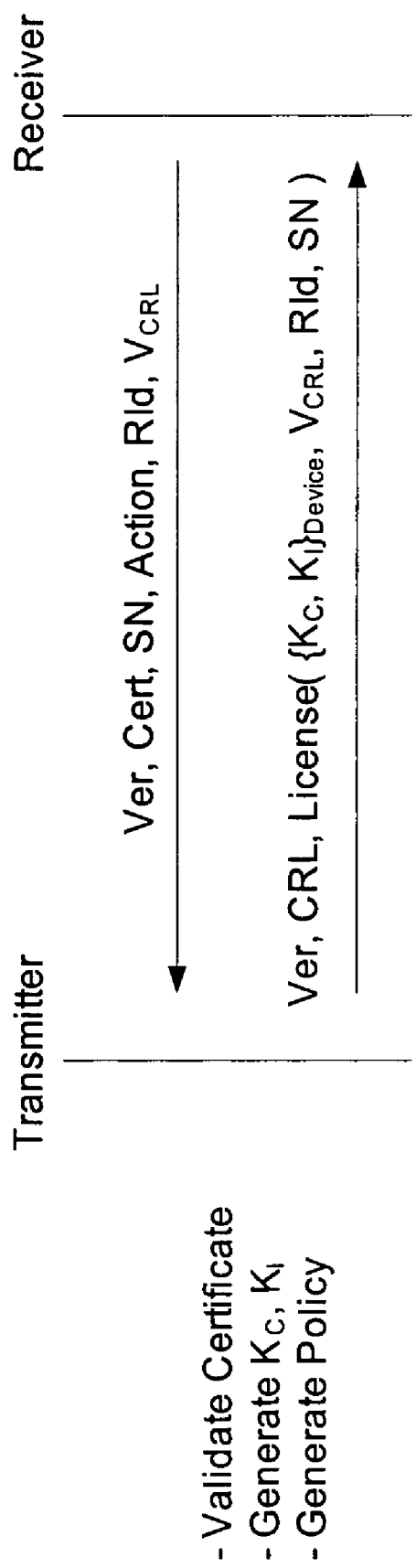
FIG. 3 illustrates an exemplary session establishment procedure of a protocol with which the inventive embodiments can be employed in one embodiment.

With regard to Session Establishment, consider the following in connection with FIG. 3 and the table just below which describes messages that are exchanged during Session Establishment.

| Message | Value | Description |
| --- | --- | --- |
| License Request Message | Ver | 8-bit Protocol Version |
| | Cert | XML digital certificate of the Receiver. |
| | SN | 128-bit Serial Number. |
| | Action | Requested usage for the content. Ex.: "Play", "Copy" or "Burn". |
| | RId | 128-bit random Rights Id. |
| | VCRL | Version of the receiver's CRL. |
| License Response Message | Ver | 8-bit Protocol Version |
| | CRL | Transmitter's CRL. Only sent in case it has a higher version number than the receiver's CRL and the receiver component also has transmitting capabilities. |
| | License | KC (encrypted with receiver's public key) 128-bit Random Content Encryption key. |
| | | KI (encrypted with receiver's public key) 128-bit Random Content Integrity key. |

-continued

| Message | Value | Description |
|---|---|---|
| | VCRL | Version of the transmitter's CRL. |
| | RId | Same 128-bit random Rights Id sent by the receiver. |
| | SN | 128-bit Serial Number. |

In this example, a License Request Message is sent from the receiver to the transmitter and contains the information described above. In response, the transmitter can send a License Response Message that contains the information described above.

In this particular example, the License is represented in XMR format and includes a Content Encryption key, a Content Integrity key, a Version of the Transmitter's CRL, a 128-bit Rights Id and a 128-bit Serial Number. The License also contains an OMAC calculated using the Content Integrity key using OMAC.

Figure 4:
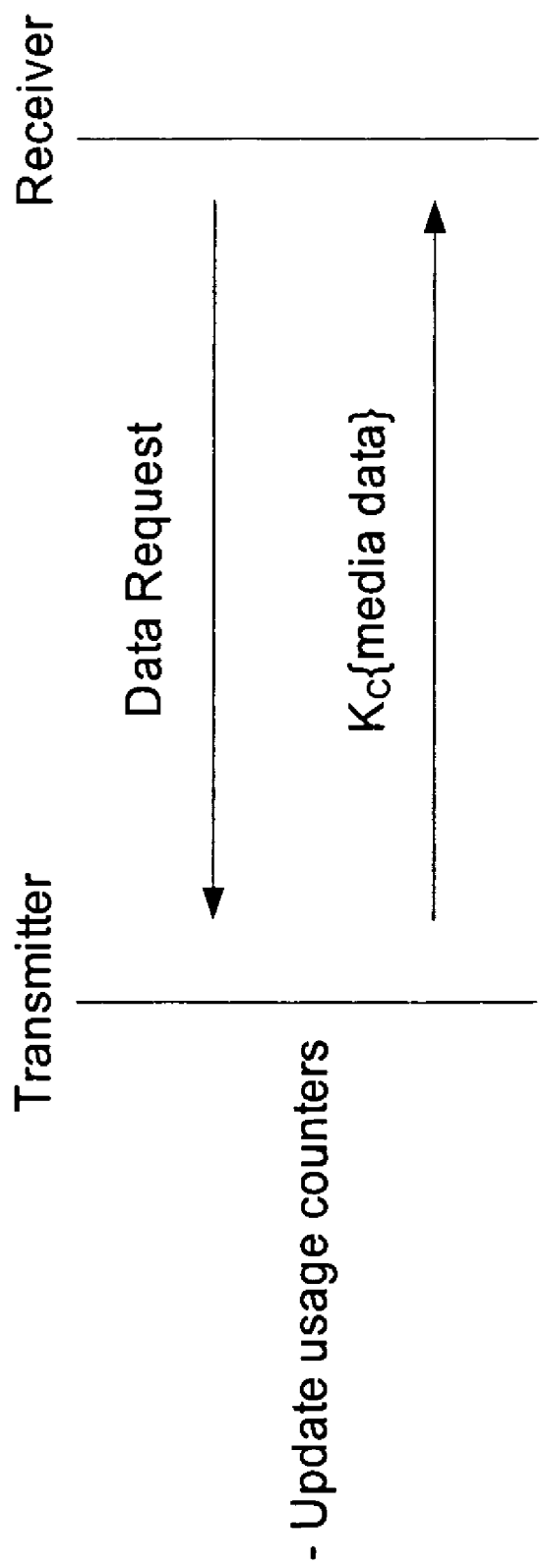
FIG. 4 illustrates an exemplary data transfer procedure of a protocol with which the inventive embodiments can be employed in one embodiment.

With regard to the Data Transfer procedure, consider the following in connection with FIG. 4. Once the Session Establishment is complete, the data transfer is executed in a control protocol specific manner. Both the Data Transfer request and response must be specifically defined for the control protocol and content type. This is conceptually represented in FIG. 4.

Having now provided a brief overview of an exemplary protocol with which the inventive embodiments can be employed, consider now some background information on RTSP.

RTSP

The Real Time Streaming Protocol or RTSP is an application-level protocol for control over the delivery of data with real-time properties (i.e. streaming), as it will be appreciated by the skilled artisan. RTSP provides an extensible framework to enable controlled, on-demand delivery of real-time data, such as audio and video. Sources of data can include both live data feeds and stored clips. This protocol is intended to control multiple data delivery sessions, provide a means for choosing delivery channels such as UDP, multicast UDP and TCP, and provide a means for choosing delivery mechanisms based upon RTP.

RTSP establishes and controls either a single or several time-synchronized streams of continuous media such as audio and video. It does not typically deliver the continuous streams itself, although interleaving of the continuous media stream with the control stream is possible. In other words, RTSP acts as a "network remote control" for multimedia servers.

The set of streams to be controlled is defined by a presentation description. In RTSP, there is no notion of an RTSP connection; instead, a server maintains a session labeled by an identifier. An RTSP session is in no way tied to a transport-level connection such as a TCP connection. During an RTSP session, an RTSP client may open and close many reliable transport connections to the server to issue RTSP requests. Alternatively, it may use a connectionless transport protocol such as UDP, as will be appreciated by the skilled artisan.

The streams controlled by RTSP may use RTP, but the operation of RTSP does not depend on the transport mechanism used to carry continuous media.

Figure 5:
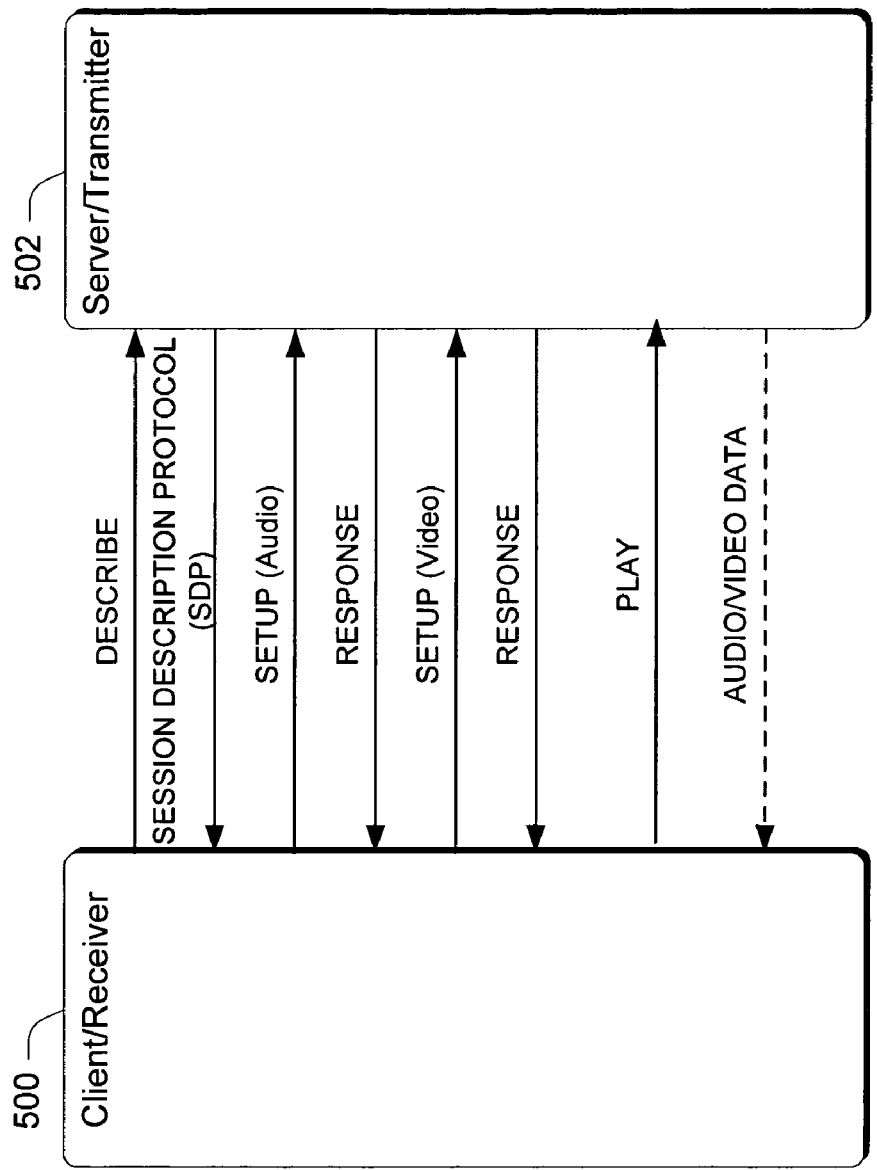
FIG. 5 illustrates aspects of a streaming protocol with which the inventive embodiments can be utilized in accordance with one embodiment.

Consider now a typical RTSP request/response exchange in connection with FIG. 5, between a client/receiver 500 and a server/transmitter 502.

Preliminarily, the RTSP requests/responses have headers which, for the sake of brevity, are not described. In RTSP, a client/receiver 500 typically issues what is known as a DESCRIBE request which is directed to retrieving a description of a presentation or media object identified by a request URL from server 502. The server 502 responds with a description of the requested resource which is represented in the SESSION DESCRIPTION PROTOCOL (SDP). The DESCRIBE response (SDP) contains all media initialization information for the resource(s) that it describes.

Next, client 500 sends a SETUP request for a URI that specifies the transport mechanism to be used for the streamed media. In the FIG. 5 example, a SETUP request is sent for both audio and video. Client 500 also indicates, in the SETUP request, the transport parameters that it will be utilizing. A transport header in the SETUP request specifies the transport parameters acceptable to the client for data transmission. The RESPONSE from server 502 contains the transport parameters selected by the server. The server also generates session identifiers in response to the SETUP requests.

At this point, the client can issue a PLAY request which tells the server to start sending data via the mechanism specified in the SETUP. Responsive to receiving a PLAY request, the server can start streaming the content which, in this example, is the audio/video content. In this example, the streaming content is encapsulated using RTP packets and is sent over UDP, as will be appreciated by the skilled artisan.

The RTSP protocol has other methods of interest which include PAUSE, TEARDOWN, GET_PARAMETER, SET_PARAMETER, REDIRECT, and RECORD. For additional background on RTSP, the reader should consult the RTSP RFC, Schulzrinne, H., Rao, A., and R. Lanphier, "Real Time Streaming Protocol (RTSP)", RFC 2326, available at http://www.ietf.org/rfc/rfc2326.txt, April 1998.

Exemplary Implementation Using RTSP

In the discussion that follows, two primary subsections appear, one entitled "Control Flow" that describes how a control flow for DRM-protected content is established using RTSP, and one entitled "Data Flow" that describes how a data flow for DRM-protected content is established using RTP. Each of these primary subsections has its own associated subsections that describe aspects of the inventive embodiments.

In the discussion that follows, a description is provided of how the Session Establishment and Data Transfer procedures of the above-described protocol are accomplished using RTSP/RTP in accordance with one embodiment. More specifically, in the "Control Flow" section below, a description is provided of how Session Establishment is accomplished using RTSP. In the "Data Flow" section, a description is provided of how the Data Transfer is accomplished using RTP.

Control Flow

In accordance with this embodiment, Session Establishment is initiated by a receiver device which is willing to playback DRM-protected content—that is, content that has an associated license. Recall from the discussion of the Content Security and License Protocol above, that the client/receiver would accordingly send a License Request Message to the server/transmitter, to which the server/transmitter would reply with a License Response Message. The License Response Message, in turn, carries a license which in the example above, is represented in eXtensible Media Rights (XMR). The license contains the policy and content key associated with the content being requested.

Carrying License Request Messages in DESCRIBE Requests

Figure 6:
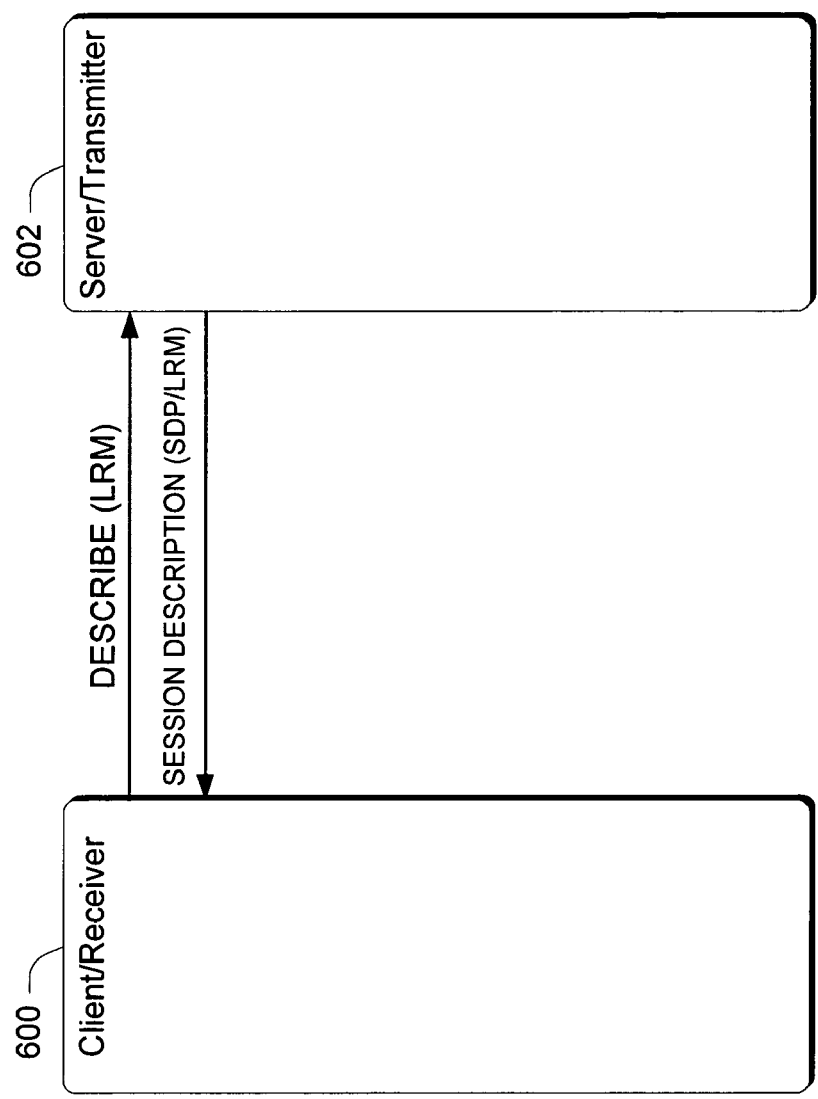
FIG. 6 illustrates the streaming protocol of FIG. 5 being utilized in connection with one embodiment.

Consider now the confluence of the Content Security and License Protocol and RTSP in connection with FIG. 6. Specifically, FIG. 6 illustrates a client/receiver 600 and a server/transmitter 602 in accordance with one embodiment. In accordance with this embodiment, when client/receiver 600 wishes to access DRM-protected content, the client inserts, in the body of the DESCRIBE request, a License Request Message.

As but one implementation example, consider the DESCRIBE request excerpt just below which incorporates a License Request Message in accordance with one embodiment.

---

DESCRIBE rtsp://eduardo01/file.wmv RTSP/1.0
Accept: application/sdp
CSeq: 1
Supported:    com.microsoft.wmdrm-nd, com.microsoft.wm.eosmsg,
   method.announce -continued Require: com.microsoft.wmdrm-nd
Content-Type: application/vnd.ms-wmdrm-license-request
Content-Length: 1078
License_Request_Message

---

The "Require: com.microsoft.wmdrm-nd" is used, in this example, to indicate that the receiver expects the server to be a particular type of transmitter. The "Content-Type: application/vnd.ms-wmdrm-license-request" is used, in this example, to indicate that the body of the DESCRIBE contains a License Request Message.

Unless there is an error, the transmitter should reply with an SDP description which includes the License Response Message described in the section immediately below.

Embedding License Response Messages in SDP Descriptions

Having received a DESCRIBE request that contains, in the body, a License Request Message, the server can return a License Response Message. In this example, the server returns an SDP description that not only contains the various parameters described before, but also the License Response Message. In this embodiment, the License Response Message, as previously indicated, will carry an XMR license that dictates which policies apply to the content.

As but one implementation example, consider the SDP excerpt just below which incorporates a License Response Message in accordance with one embodiment.

---

RTSP/1.0 200 OK
Last-Modified: Thu, 19 Dec 2002 15:36:18 GMT
Content-Length: 1891
Content-Type: application/sdp
CSeq: 1
Supported:    com.microsoft.wmdrm-nd, com.microsoft.wm.eosmsg,
   method.announce
SDP_Description

---

In accordance with one embodiment, the SDP returned by the transmitter includes the License Response Message encoded in a data URL according to the specification in RFC-2397 (http://www.ietf.org/rfc/rfc2397.txt). The data contained in the data URL, in this example, must be Base64 encoded and the MIME type must be set to "application/vnd.ms-wmdrm-license-response".

As an example of the syntax, consider the following:

--- data:application/vnd.ms-wmdrm-license-response;base64,
AggAAAAAAAABOFhNUgAAAAAB+TTbzXCRw1s+/jA4fQQY0wADAAEAAAEgAAMAAgAAADwAAQAD
AAAAEgBkAAAAAAAAAAAAAQAMAAAAGKRuHVtxsJ1Lk7WPrQPe5X0AAQANAAAACgABAAMABAAA
ABoAAQAFAAAAEgBkAGQAZABkAGQAAwAJAAAApgABAAoAAACeajiAiUBMGrAGUAOIqMGBggAB
AAEAgC7V1QF54EzuYbTYKPbgBEK6nDXGtbV+bJKF+Cn2yd/FUaC4vTIOxkF/eQLx+FqvLCUM
txvRSw01dns9Ejt021se2T+IROiZA0t5pRuNl3gq7JK9JKs+ZX8hKsEJFW0V7cyp9wdaCMh2
esJ97r9agHlSxf0mAqcQ0j1Q5dtXlWx/AAEACwAAABwAAQAQZZaX5nGEUAV8w6p6BQr++Q==

---

The data URL, in this example, must be inserted at the SDP session level using a "a=key-mgmt" attribute, according to the SDP key management extensions specification, which continues to be a work in progress as of this date). The syntax is as follows:

--- a=key-mgmt:wmdrm-nd URL

---

The URL parameter is the data URL described above.

Carrying License Response Messages in ANNOUNCE Requests

Consider now that certain media files contain segments which require different policies to be enforced. Take, as an example, the case of files generated by Windows Media Center Edition for TV recordings. Such files are protected by WMDRM and have multiple policies associated with them.

For example, Macrovision may be required for a TV show, but not for the commercial segments that appear within this same recording.

This requirement results in the need to define a mechanism for delivering updated policies during the middle of the stream. In accordance with one embodiment, updated policies can be delivered in the middle of a stream using RTSP's ANNOUNCE request. In this embodiment, the ANNOUNCE requests carry License Response Messages which contain new XMR licenses.

In this example, there are two different instances in which policies associated with streaming media may change. In a first instance, only the policies associated with a particular stream may change. In a second instance, both policies and the content format itself can change.

Consider the first instance in which only the policies associated with the streaming media change. One example of this case would be a switch between a segment of a TV show and a commercial, in which the TV segment requires Macrovision to be enabled on analog outputs while the commercial does not. Notice that in this example only the policy changes: the encoding parameters, such as bitrate, codec, etc. remain the same.

Consider the second instance in which both the policies and the content format changes. An example of this case would also be a switch between a segment of a TV show and a commercial, with the same type of change to the policy. However, in this example, the TV show and the commercial are encoded using different encoding parameters, such as a transition from a High Definition encoding to a Standard Definition encoding. Such scenarios are commonly denominated "format changes". Another example of this case relates to what is commonly known as "entry changes". Entry changes are typically a consequence of a switch in media files that are being delivered by the server as part of a "server-side playlist". These playlists may be composed of a collection of media files which do not necessarily share any encoding parameters or policies.

Figure 7:
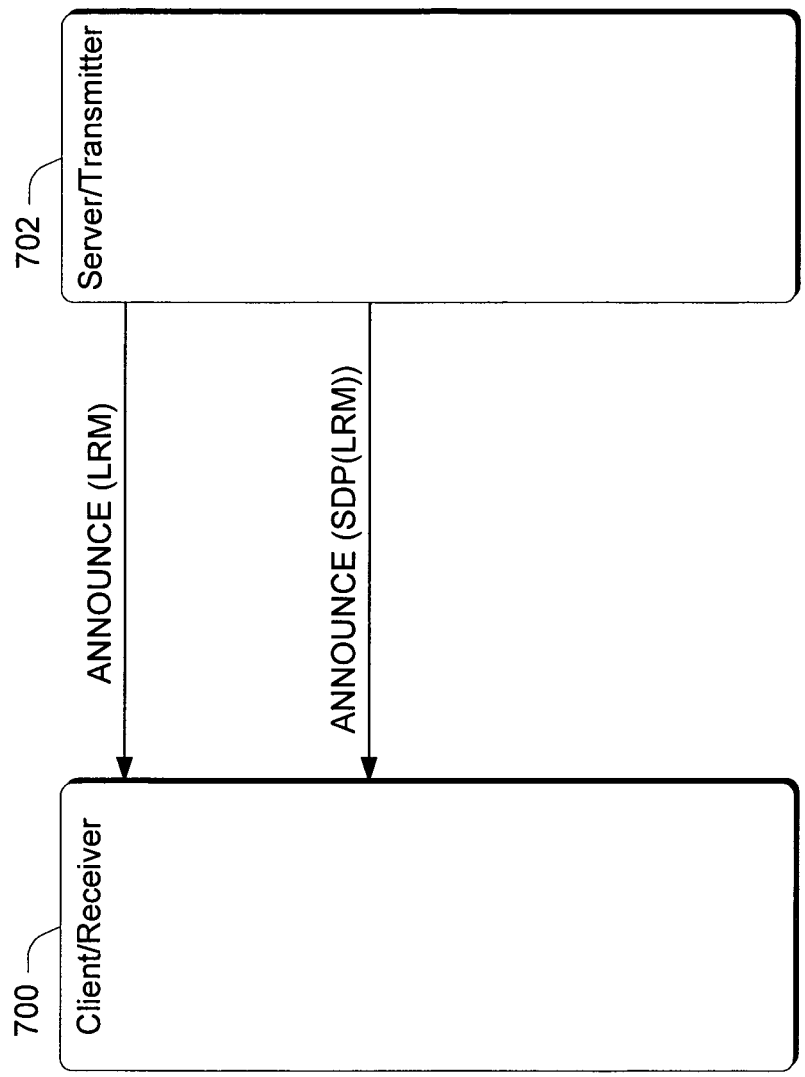
FIG. 7 illustrates the streaming protocol of FIG. 5 being utilized in connection with one embodiment.

Whenever policies change but formats do not, as illustrated in the first case, the server only sends a new policy to the client, as part of the body of the ANNOUNCE request. In this case, a License Response Message is included in the body of an ANNOUNCE message. As an example, consider FIG. 7 which illustrates an exemplary client/receiver 700 and a server/transmitter 702 which has issued an ANNOUNCE request to the client/receiver to articulate a new license with the updated policies.

Whenever policies change and formats do so as well, as illustrated in the second case, the server delivers to the client an updated SDP description. This SDP description is required in order to describe the format changes that took place. In this example, SDP descriptions, in the case of format changes, are also delivered as ANNOUNCE requests. So instead of delivering two consecutive ANNOUNCE requests, one containing the format change, and another containing the policy change, the server may send only one ANNOUNCE request, which carries an SDP description. The policy change is then communicated as a License Response Message embedded in the SDP description. Consider again FIG. 7 which illustrates an ANNOUNCE request whose body contains an updated SDP having an embedded License Response Message.

The format for embedding License Response Messages in SDP descriptions that are part of ANNOUNCE requests is the same as described previously for embedding SDP descriptions that are part of DESCRIBE responses.

Figure 8:
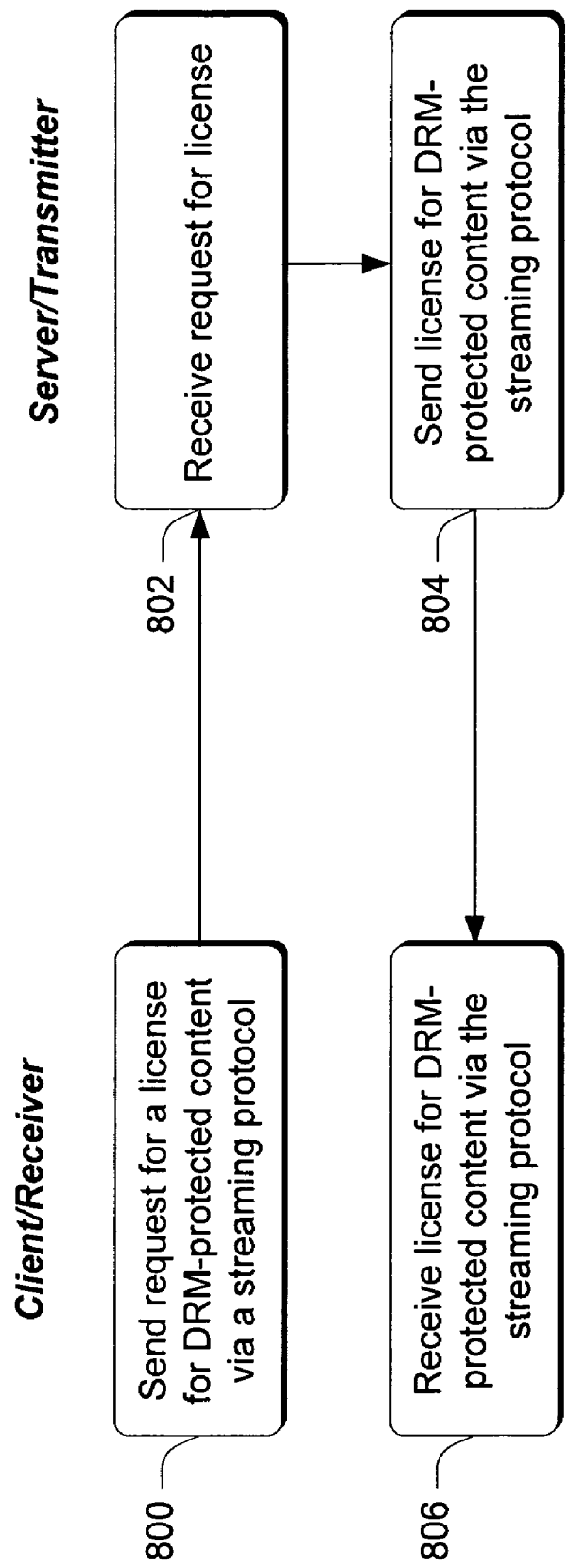
FIG. 8 is a flow diagram that describes steps in a method in accordance with one embodiment.

FIG. 8 is a flow diagram that describes steps in a method in accordance with one embodiment. The method can be implemented in connection with any suitable hardware, software, firmware or combination thereof. In one embodiment, the method is implemented as a set of computer-readable instructions or software code that is embodied on some type of computer-readable media.

Step 800 attempts to establish a control flow by sending a request for a license for DRM-protected content via a streaming protocol. In the illustrated and described embodiment, this step is executed by a client/receiver. One specific example of a request for a license is the License Request Message which is described above. Other request types or formats can be utilized without departing from the spirit and scope of the claimed subject matter. In addition, one example of a streaming protocol (i.e. RTSP) is described above. Other streaming protocols can be used with departing from the spirit and scope of the claimed subject matter. In the RTSP embodiment, the request is inserted into the body of a DESCRIBE request.

Step 802 attempts to establish a control flow by receiving the request for a license. This step is implemented, in this example, by a server/transmitter. Responsive to receiving the request, step 804 can send a license to the client/receiver using the streaming protocol. One specific example in which a license is returned to the client/receiver is provided above in which a license in the form of a License Response Message is sent to the client/receiver. Other response types or formats can be utilized without departing from the spirit and scope of the claimed subject matter. In addition, one example of a streaming protocol (i.e. RTSP) is described above. Other streaming protocols can be used with departing from the spirit and scope of the claimed subject matter. In the RTSP embodiment, the response is sent in the SDP.

It is to be appreciated and understood that step 804 can also be implemented to send updates to the client/receiver. In this instance and in the context of the RTSP example, updates can be delivered using ANNOUNCE requests as described above.

Step 806 receives the license via the streaming protocol. In the illustrated and described embodiment, this step is implemented by the client/receiver. After receiving the license, the client can access and consume the content pursuant to terms defined in the license.

The data flow that follows the license acquisition process is described just below.

Data Flow

Having described exemplary embodiments of a control flow that utilizes RTSP in connection with DRM-protected content, consider now the data flow that contains or enables communication of the actual DRM-protected content.

In the embodiments described below, DRM-protected content is communicated between a transmitter and a receiver using RTP as a data transfer protocol. That is, DRM-protected content is communicated from the transmitter and communicated to the receiver.

In the particular examples provided, two different approaches are described. In the first approach, the RTP payload format that is utilized supports extensions which, in turn, allows encryption parameters such as key ID extensions and initialization vectors to be included in the RTP packet so that encrypted payload data can undergo a decryption process and be decrypted. In the second approach, the RTP payload format does not support extensions. Hence, in this approach, a Descriptor is defined and associated with the RTP packet that contains the encrypted payload. The Descriptor contains encryption parameters such as key ID extensions and initialization vectors that can be used in a decryption process to decrypt the encrypted payload data.

Carrying Sample-Encrypted Payloads Over Windows Media Payload Format

Figure 9:
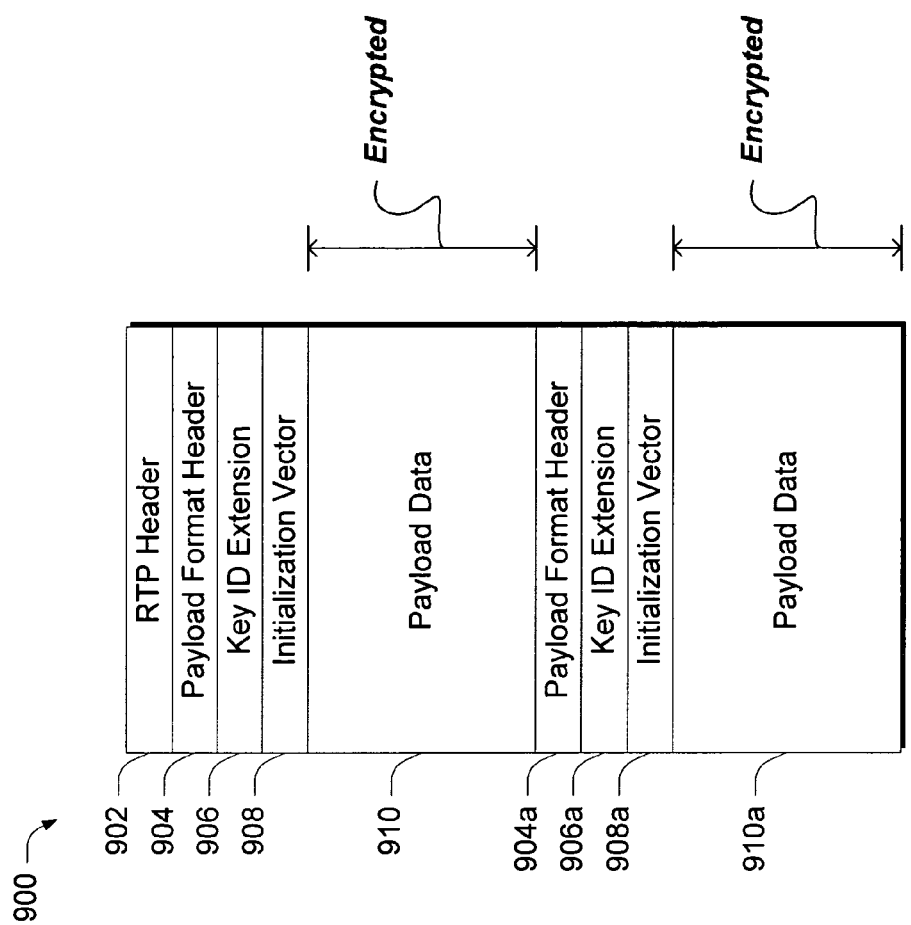
FIG. 9 illustrates a packet in accordance with one embodiment.

FIG. 9 illustrates exemplary portions of an RTP packet in accordance with one embodiment, generally at 900. In this embodiment, the RTP payload format that is utilized supports extensions in a manner that enables encryption parameters, such as key ID extensions and initialization vectors, to be included in the RTP packet along with the encrypted payload content. But one example of such a format is Windows Media RTP Payload format, which is described at http://download-.microsoft.com/download/5/5/a/55a7b886-b742-4613-8ea8-d8b8b5c27bbc/RTPPayloadFormat_for_WMAandWMV_vl.doc. Other formats can, however, be utilized without departing from the spirit and scope of the claimed subject matter.

Packet 900, in this example, comprises an RTP header 902 and a payload format header 904. The payload format header, in this example, allows for extensions. As such, packet 900 further comprises a key ID extension 906 and an initialization vector 908, along with encrypted payload data 910 (either audio or video data) that is associated with and can be decrypted using key ID extension 906 and initialization vector 908. Further, RTP packet 900 can include multiple other encrypted payloads. In this particular example, packet 900 further comprises another payload format header 904a, key ID extension 906a initialization vector 908a along with encrypted payload data 910a (either audio or video data) that is associated with and can be decrypted using key ID extension 906a and initialization vector 908a.

In this particular embodiment, one RTP packet can contain multiple different encrypted payloads. As a specific implementation example in but one specific context, consider the following in connection with Windows Media Audio and Video Content.

When carrying Windows Media content protected by licenses as described above, the following values and fields must be set in the RTP packet.

1. The "Encryption" bit (E) in the Bit Field 2 of the "MAU Properties" section must be set to 1.
2. The "Extension Present" bit (X) in the "MAU Timing" section must be set to 1, to indicate the presence of Extension fields.
3. The "Encrypted Payload Boundary" extension must not be present.
4. A "WMDRM Initialization Vector" extension must be included. The following values must be set:
   a. The "Extension Type" must be set to 2.
   b. The "Extension Length" must be set to 8 (meaning 64 bits).
   c. The "Extension Data" must be set with the Sample ID value as defined in the section entitled "Sample Encryption" just below.
   d. This extension must be included for the first payload of every MAU. If the MAU is fragmented into multiple payloads, this extension should only be present in the first payload.
5. A "WMDRM Key ID" extension must be included. The following values must be set:
   a. The "Extension Type" must be set to 3.
   b. The "Extension Length" must be set to 16 (meaning 128 bits).
   c. The "Extension Data" must be set with the Key ID value from the ASF Content Encryption Object when carrying ASF content. Alternatively, it is set to a Key ID value that represents the Encryption Key in use when carrying non-ASF content, such as DVR-MS.
   d. This extension must be included for the first payload in each multiple-payload RTP packet in order to address packet loss problems.

Sample Encryption

Figure 10:
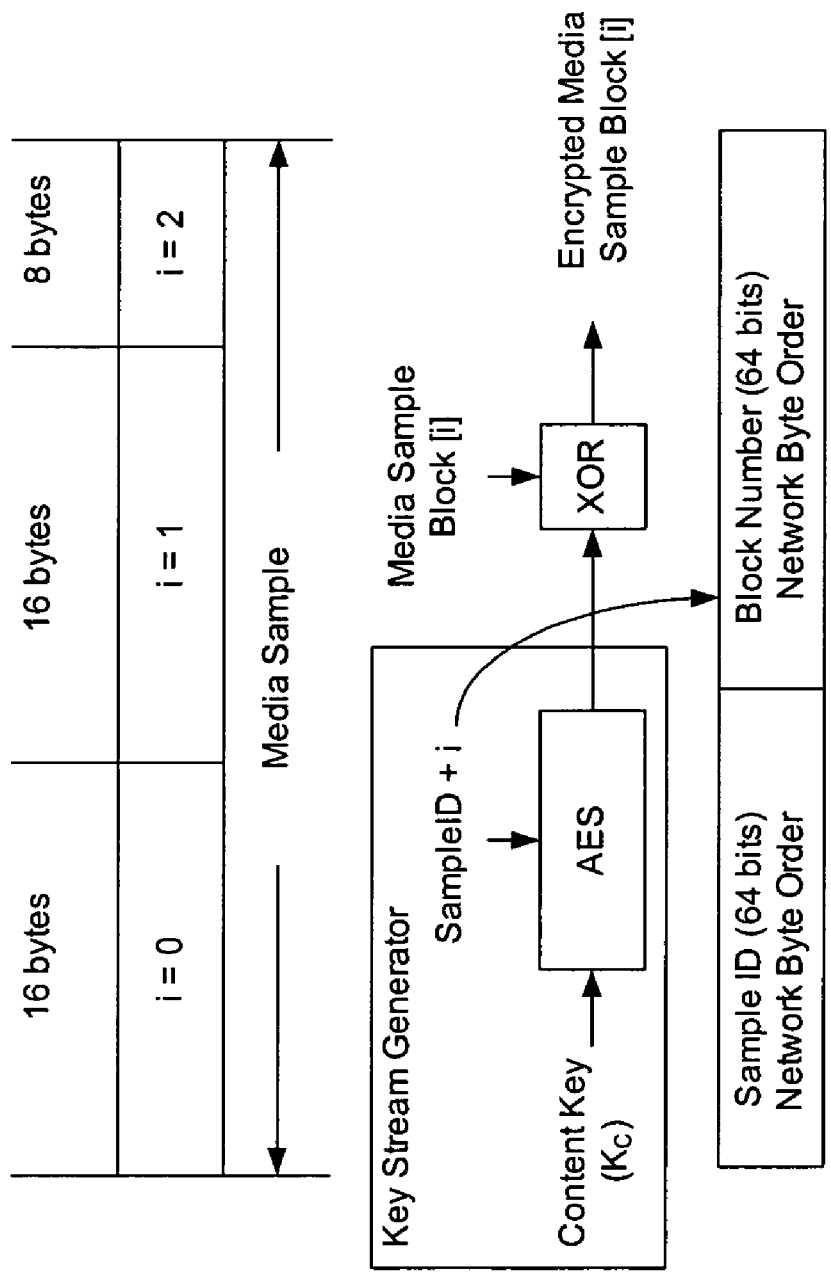
FIG. 10 illustrates sample encryption in accordance with one embodiment.

As a further explanation of item 4(c) above, consider the following. In this embodiment, each sample should be encrypted using AES in Counter mode. FIG. 10 illustrates a process for encrypting a single sample using this technique.

In this embodiment, Counter mode creates a stream of bytes that are then XOR'd with the clear text bytes of the media sample to create the encrypted media sample. The Key Stream Generator uses an AES round to generate 16-byte blocks of key stream at a time. The inputs to the AES round are the Content Encryption key ($K_C$) and the 128-bit concatenation of a Sample ID and the block number within the sample.

The output of key stream generator should be XOR'd byte by byte with the data from the corresponding block (i) of the media sample. In the case that the media sample is not evenly divisible by 16 bytes only the valid bytes of the media data from the last block should be XOR'd with the key stream and retained for the encrypted sample.

When encrypting samples from an ASF file, the Sample ID is equivalent to the Sample ID from the payload extension.

Hence, in this embodiment, data is encrypted and decrypted according to "sample" boundaries, which are the natural boundaries for the given media type, e.g. a video frame for a video stream or a block of audio samples for an audio stream.

Carrying Link-Encrypted Payloads Over RTP Payload Format Using Data Segment Descriptors FIG. 11 illustrates aspects of a packet in accordance with another embodiment, generally at 1100. In this example, packet 1100 can include an IP header 1102, a UDP header 1104, an RTP header 1106, a payload format header 1108, payload data 1110 and a descriptor 1112. In this particular example, the descriptor is appended to the end of the payload data, although it can be placed at any suitable location. Placing the descriptor at the end of the payload data can mitigate backward compatibility issues, as will be appreciated by the skilled artisan.

In this embodiment, the RTP packet with the exception of the RTP header, is treated as a data segment associated with the descriptor 1112. Descriptor 1112, in turn, carries with it the encryption parameters that can be used in a decryption process that enables payload data 1110 to be decrypted. In this particular example, a single policy and content encryption key applies to the payload data 1110.

In accordance with one embodiment, descriptor 1112 comprises a data structure as follows:

| Sections | Fields |
| --- | --- |
| Flags | 8-bit Flags |
| Extensions | 8-bit Number of Extensions |
| | Multiple Variable Length Extensions |
| Length | Data Segment Descriptor Length |

In this example, the Flags section is a bit-field indicating attributes of the data. The following values are currently defined: 0x01 indicates encrypted data. When this flag is set, it indicates that the data is in encrypted form. Otherwise, the data is in the clear.

With regard to the Extensions section, the Number of Extensions field indicates the number of variable length extensions included in this descriptor. With regard to the Variable Length Extension field, each extension has the following format:

| Fields |
| --- |
| 8-bit Extension Type |
| 16-bit Extension Length |
| Variable Length Extension |

In accordance with one embodiment, a key ID extension and a data segment ID extension are defined as follows:

Key ID Extension

Extension Type: Must be set to 0x01 for Key ID Extension.

Extension Length: Must be set to 16, which represents 128 bits (16 bytes).

Extension: Must contain the Key ID value for the encrypted media delivered in conjunction with this descriptor. This extension is only used when the Encrypted Data flag is set.

Data Segment ID Extension

Extension Type: Must be set to 0x02 for Data Segment ID Extension.

Extension Length: Must be set to 8, which represents 64 bits (8 bytes).

Extension: Must contain the Data Segment ID for the encrypted media delivered in conjunction with this descriptor. This extension is only used when the Encrypted Data flag is set.

With regard to the Length section, in this embodiment, this section must contain the total length of the Data Segment descriptor in bytes. This length does not include the size of the media data delivered in conjunction with this descriptor.

CONCLUSION

Various embodiments described above utilize methods for protecting content, such as Digital Rights Management (DRM), to enable secure playback of content on machines and devices within a local network, such as a home media network. In at least some embodiments, messages and content are delivered over Real Time Streaming Protocol (RTSP) and Real Time Transport Protocol (RTP), and protocol extensions are introduced which enjoy advantages offered by RTSP/RTP, including data delivery over User Datagram Protocol (UDP) and bi-directional communication between client and server.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A computer-implemented method comprising:
receiving a control flow request from a client;
establishing a control flow responsive to the control flow request, the control flow establishing an exchange of a protected media content with the client using a Real Time Streaming Protocol (RTSP) for streaming, the establishing comprising:
  receiving, from the client, a license request message in the body of an RTSP DESCRIBE request;
  sending, to the client, a description using an RTSP Session Description Protocol (SDP) which includes a license response message that contains a license;
  communicating the protected media content to the client using a data flow, wherein the data flow uses a transport protocol, wherein the communicating comprises streaming and the transport protocol comprises Real Time Transport Protocol (RTP) with the protected media content encapsulated in an RTP packet, the RTP packet containing encryption parameters used in a decryption process to decrypt the protected media content; and
  sending to the client an RTSP ANNOUNCE request to change a protected media content policy or both a protected media content policy and a protected media content format associated with the protected media content during streaming of the protected media content, wherein the RTSP ANNOUNCE request comprises a new license response message that contains a new license, the new license dictating the changed protected media content policy that applies to the protected media content at a point during the streaming of the protected media content, wherein, when both the protected media content policy and the protected media content format are to be changed, the new license response message is embedded in an updated SDP description sent via the RTSP ANNOUNCE request, wherein the protected media content policy is selected from a group comprising enabling, disabling and changing a copy protection scheme.

2. A computer-implemented method comprising:
establishing a control flow with a server for exchanging a protected media content with the server using a Real Time Streaming Protocol (RTSP) by sending a license request message in a body of an RTSP DESCRIBE request;
accepting, in response to the license request message, a license response message from the server that contains a license;
receiving the protected media content from the server via Real Time Transport Protocol (RTP) with the protected media content encapsulated in an RTP packet, the RTP packet comprising encryption parameters used in a decryption process to decrypt the protected media content; and
updating, with an RTSP ANNOUNCE request received from the server, a protected media content policy or both a protected media content policy and a protected media content format associated with the protected media content during the exchanging of the protected media content, wherein the RTSP ANNOUNCE request comprises a new license response message that contains a new license, the new license dictating the updated protected media content policy to apply to the protected media content at a point during the exchanging of the protected media content, wherein, when both the protected media content policy and the protected media content format are to be updated, the new license response message is embedded in an updated SDP description in the RTSP ANNOUNCE request.

3. The method of claim 2, wherein the RTP packet further comprises multiple different encrypted payloads.

4. The method of claim 3, wherein the encryption parameters comprise a key ID extension and an initialization vector for each encrypted payload.

5. The method of claim 2, wherein the receiving comprises:
identifying a descriptor in the RTP packet that comprises encryption parameters utilized in a decryption process to decrypt the protected media content; and
associating the descriptor with the protected media content.

6. The method of claim 5, wherein the descriptor is appended to an end of the protected media content in the RTP packet.

7. The method of claim 5, wherein the protected media content comprises being decrypted using a single key referenced by the descriptor.

8. The method of claim 2, wherein
the license response message which contains the license is included in an RTSP Session Description Protocol (SDP).

9. A computer-implemented method comprising:
establishing a control flow with a receiver for exchanging protected media content using a Real Time Streaming Protocol (RTSP) in response to receiving a license request message in a body of an RTSP DESCRIBE request;
replying to the license request message with a license response message that contains a license;
sending protected media content to the receiver using a data flow, wherein the data flow uses a transport protocol, wherein the sending comprises streaming and the transport protocol comprises Real Time Transport Protocol (RTP) with the protected media content encapsulated in an RTP packet, the RTP packet containing encryption parameters used in a decryption process to decrypt the protected media content; and
updating, with an RTSP ANNOUNCE request, a protected media content policy or both a protected media content policy and a protected media content format associated with the protected media content during streaming of the protected media content, wherein the RTSP ANNOUNCE request comprises a new license response message that contains a new license, the new license dictating the protected media content policy to apply to the protected media content at a point during the streaming of the protected media content, wherein, when both the protected media content policy and the protected media content format are to be updated, the new license response message is embedded in an updated SDP description sent via the RTSP ANNOUNCE request.

10. A computer-implemented method comprising:
establishing a control flow for exchanging protected content using a control protocol for streaming;
streaming protected content using a data flow, wherein the data flow uses a transport protocol comprising Real Time Transport Protocol (RTP) with the protected content encapsulated in an RTP packet, wherein the RTP packet comprises encryption parameters used in a decryption process to decrypt the protected content; and
updating a policy or both a policy and format information associated with the protected content during streaming of the protected content, wherein the act of updating comprises sending updates via the control protocol for streaming, and wherein the control protocol for streaming comprises a Real Time Streaming Protocol (RTSP) and the updates are sent via RTSP ANNOUNCE requests, wherein each of the RTSP ANNOUNCE requests comprise a license response message that contains a license, the license dictating which policies apply to the protected content at a point during the streaming of the protected content, wherein, when both the policy and the format information are to be updated, each new license response message is embedded in an updated SDP description sent via each of the RTSP ANNOUNCE requests.

11. The method of claim 10, wherein the RTP packet further comprises multiple different encrypted payloads.

12. The method of claim 11, wherein the encryption parameters comprise a key ID extension and an initialization vector for each encrypted payload.

13. The method of claim 10, the method further comprising:
identifying a descriptor in the RTP packet that comprises encryption parameters utilized in a decryption process to decrypt the protected content; and
associating the descriptor with the protected content.

14. The method of claim 13, wherein the descriptor is appended to an end of the protected content in the RTP packet.

15. The method of claim 13, wherein the decryption process comprises the protected content being decrypted using a single key referenced by the descriptor.

16. The method of claim 10, wherein the license response message that contains the license is included in an RTSP Session Description Protocol (SDP).

* * * * *